United States Patent
Dennison

(10) Patent No.: US 11,067,271 B2
(45) Date of Patent: Jul. 20, 2021

(54) POST MIX NOZZLE DESIGN

(71) Applicant: William E. Dennison, Mentor, OH (US)

(72) Inventor: William E. Dennison, Mentor, OH (US)

( * ) Notice: Subject to any disclaimer, the term of this patent is extended or adjusted under 35 U.S.C. 154(b) by 125 days.

(21) Appl. No.: 16/094,794

(22) PCT Filed: Apr. 20, 2017

(86) PCT No.: PCT/US2017/028680
§ 371 (c)(1),
(2) Date: Oct. 18, 2018

(87) PCT Pub. No.: WO2017/184890
PCT Pub. Date: Oct. 27, 2017

(65) Prior Publication Data
US 2019/0128515 A1    May 2, 2019

Related U.S. Application Data

(60) Provisional application No. 62/325,002, filed on Apr. 20, 2016.

(51) Int. Cl.
*F23D 14/32* (2006.01)
*F23D 14/22* (2006.01)
(Continued)

(52) U.S. Cl.
CPC .............. *F23D 14/32* (2013.01); *B23P 15/00* (2013.01); *F23D 14/22* (2013.01); *F23D 14/48* (2013.01);
(Continued)

(58) Field of Classification Search
CPC .......... B23P 15/00; F23D 14/22; F23D 14/32; F23D 14/48; F23D 14/54; F23D 14/58; F23D 14/66
(Continued)

(56) References Cited

U.S. PATENT DOCUMENTS 4,455,176 A * 6/1984 Fuhrhop ................. F23D 14/42
148/194
4,566,676 A   1/1986 Lotz
(Continued)

OTHER PUBLICATIONS

PCT/US2017/0028680 International Search Report and Written Opinion, dated Aug. 1, 2017.

*Primary Examiner* — Scott R Kastler
*Assistant Examiner* — Michael Aboagye
(74) *Attorney, Agent, or Firm* — Fay Sharpe LLP

(57) ABSTRACT

A cutting nozzle assembly and associated method of making same includes a nozzle having a central bore extending therethrough along a longitudinal axis through which an associated cutting gas is discharged. A plurality of spaced fuel gas bores are arranged around the central bore, and preheat passages are arranged around both the central bore and the fuel gas bores. A retaining nut receives at least a portion of the nozzle therein, and the retaining nut includes a shroud extending axially outward from a discharge end of the nozzle. At least one of an inner surface of the shroud and the additional preheat passages are angled inwardly toward the longitudinal axis. The fuel gas bores and the preheat passages each have the same cross-sectional dimension, and twice the number of preheat passages as fuel gas bores are provided.

21 Claims, 8 Drawing Sheets

(51) Int. Cl.
*F23D 14/54* (2006.01)
*F23D 14/58* (2006.01)
*F23D 14/66* (2006.01)
*B23P 15/00* (2006.01)
*F23D 14/48* (2006.01)

(52) U.S. Cl.
CPC ............. *F23D 14/54* (2013.01); *F23D 14/58* (2013.01); *F23D 14/66* (2013.01)

(58) Field of Classification Search
USPC .................. 266/48, 76, 77, 904; 148/194
See application file for complete search history.

(56) References Cited

U.S. PATENT DOCUMENTS

| | | | |
|---|---|---|---|
| 4,821,963 A | 4/1989 | Arnout et al. | |
| 5,700,421 A | 12/1997 | Bissonnette | |
| 6,277,323 B1* | 8/2001 | Bissonnette | ............ F23D 14/54 266/48 |
| 9,764,405 B2 | 9/2017 | Lotz | |
| 2016/0052075 A1 | 2/2016 | Lotz | |

* cited by examiner

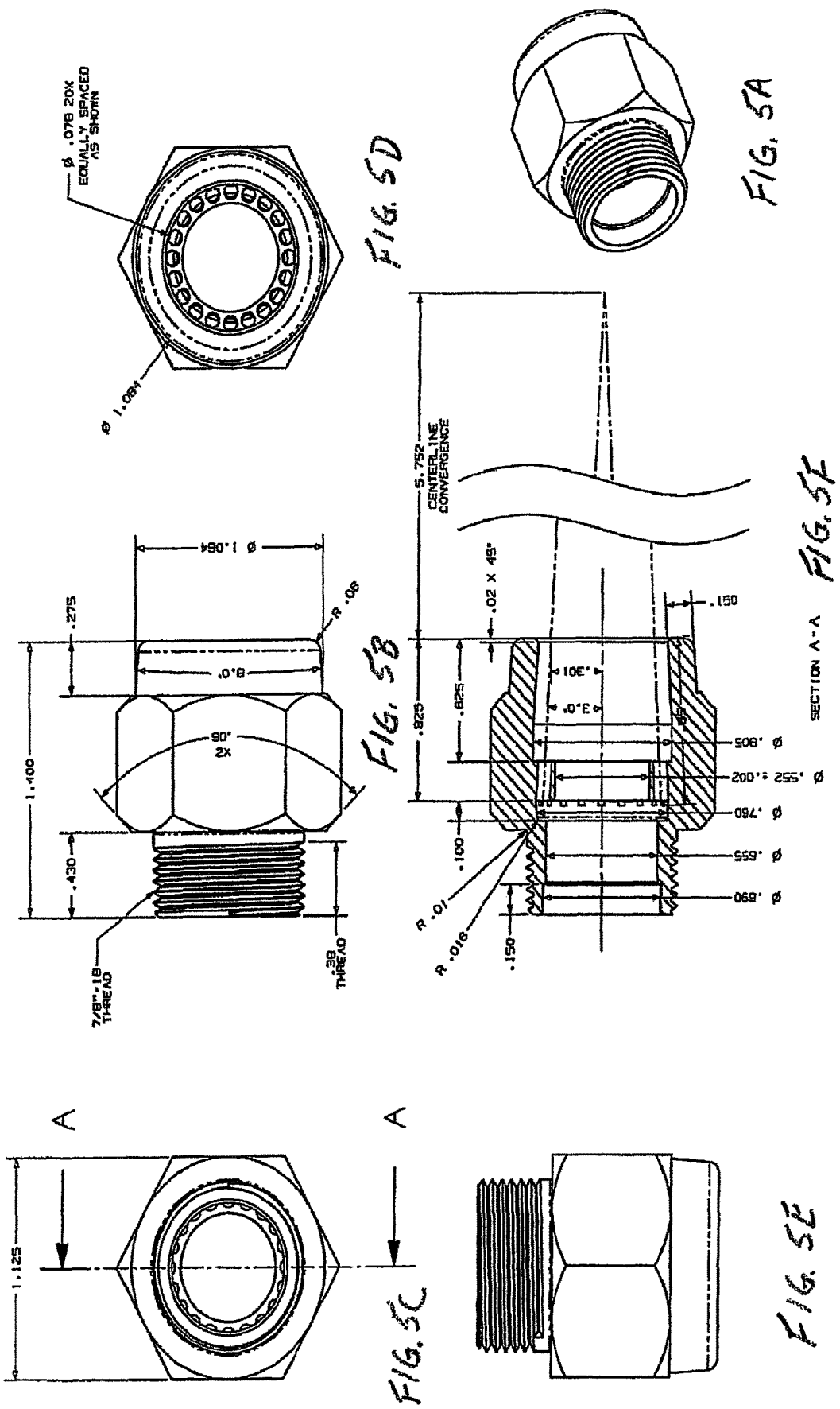

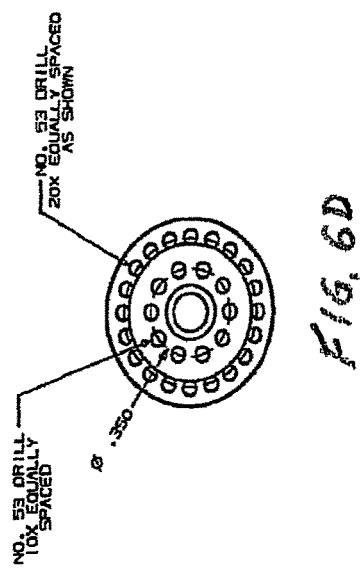
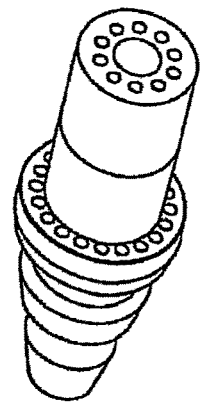
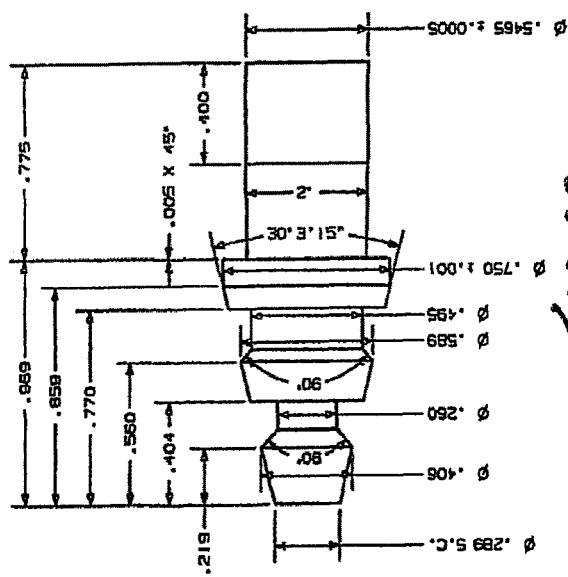
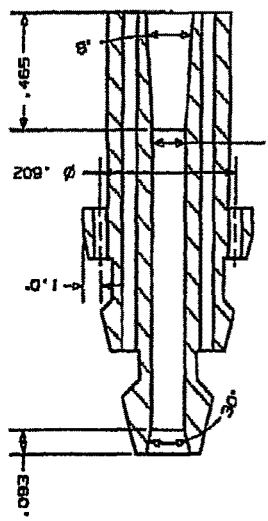
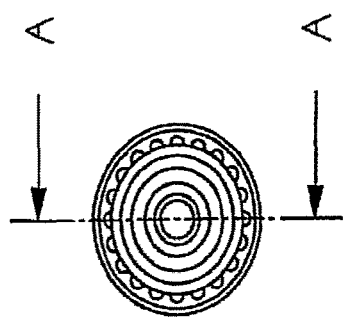

POST MIX NOZZLE DESIGN

This application claims the priority benefit of U.S. provisional application Ser. No. 62/325,002, filed Apr. 20, 2016, the disclosure of which is incorporated herein by reference.

BACKGROUND

This invention relates to improvements to post-mixed oxygen-fuel cutting nozzles and specifically of the type as shown and described in U.S. Pat. No. 5,700,421, which is a post-mixed cutting nozzle with an outer cylindrical shroud, the disclosure of which is incorporated herein by reference.

SUMMARY

This invention improves the ratio of pre-heat gases from prior art designs.

This disclosure increases total volume of pre-heat gases.

One benefit of these improvements is the ability to minimize gas pressures.

Minimizing gas pressures thus reduces overall gas consumption and reduces waste.

Another benefit relates to improved performance as a result of a more focused, well-defined flame.

Still other benefits and advantages of the present disclosure will become more apparent from reading and understanding the following detailed description.

BRIEF DESCRIPTION OF THE DRAWINGS

Eight (8) sheets of Figures accompany this disclosure and illustrate details of the invention.

FIG. 5 is a series of views illustrating the sleeve component of the post mix nozzle design assembly.

FIG. 6 is a series of views illustrating the tip of the post mix nozzle design assembly.

DETAILED DESCRIPTION

Figure 1:
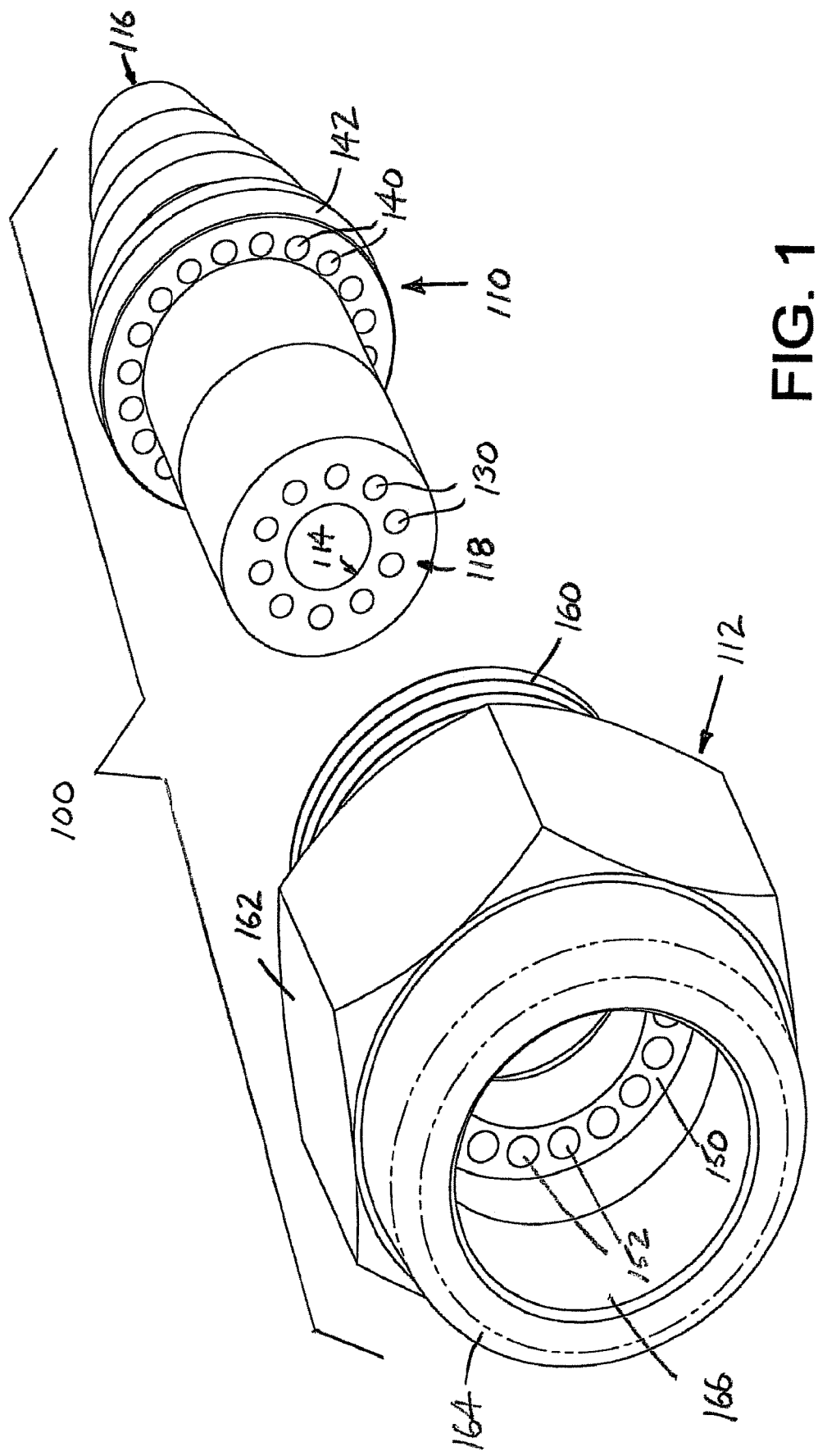
FIG. 1 is an exploded view of the post mix nozzle design.
Figure 2:
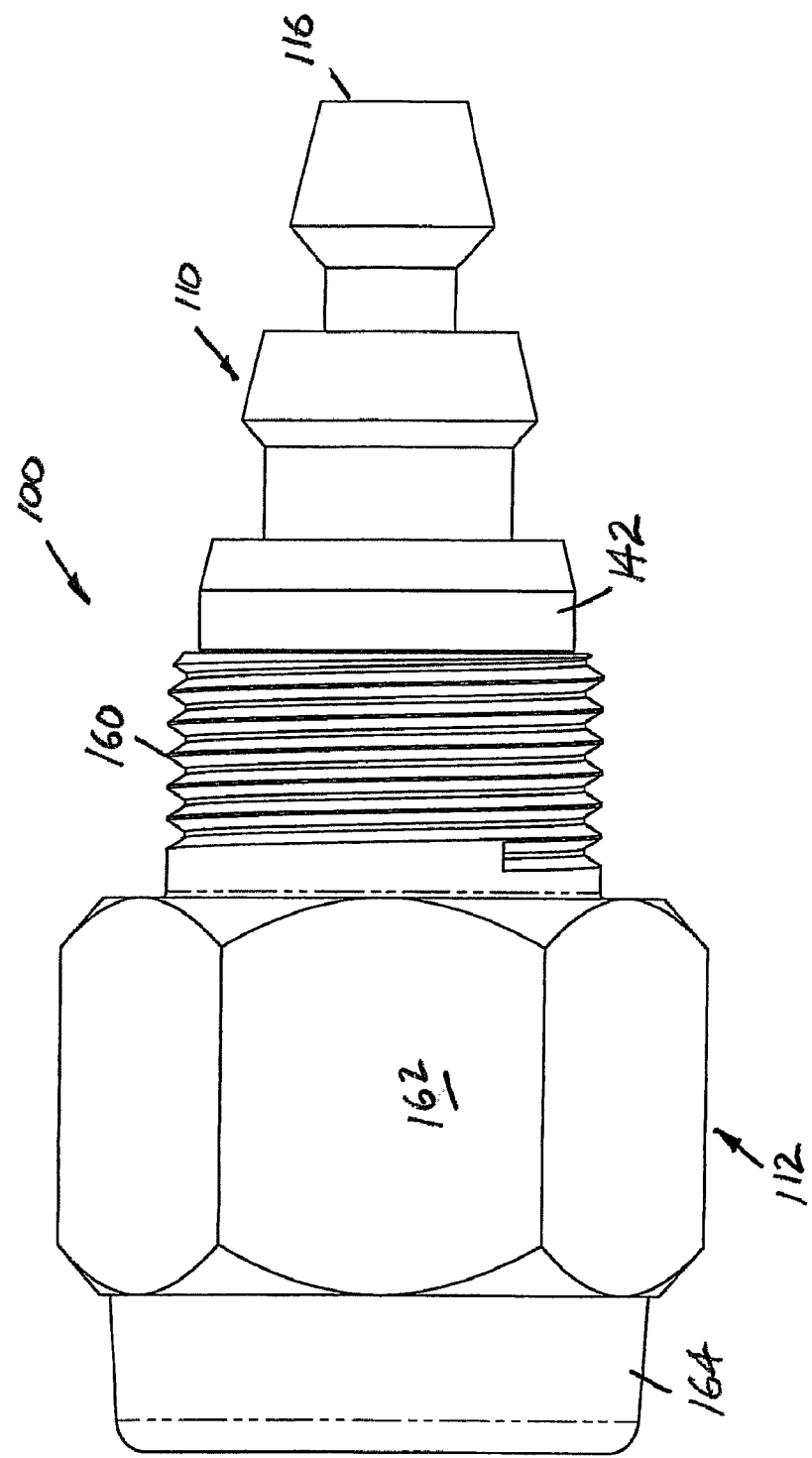
FIG. 2 is an elevational view of the assembled post mix nozzle design of FIG. 1.
Figure 3:
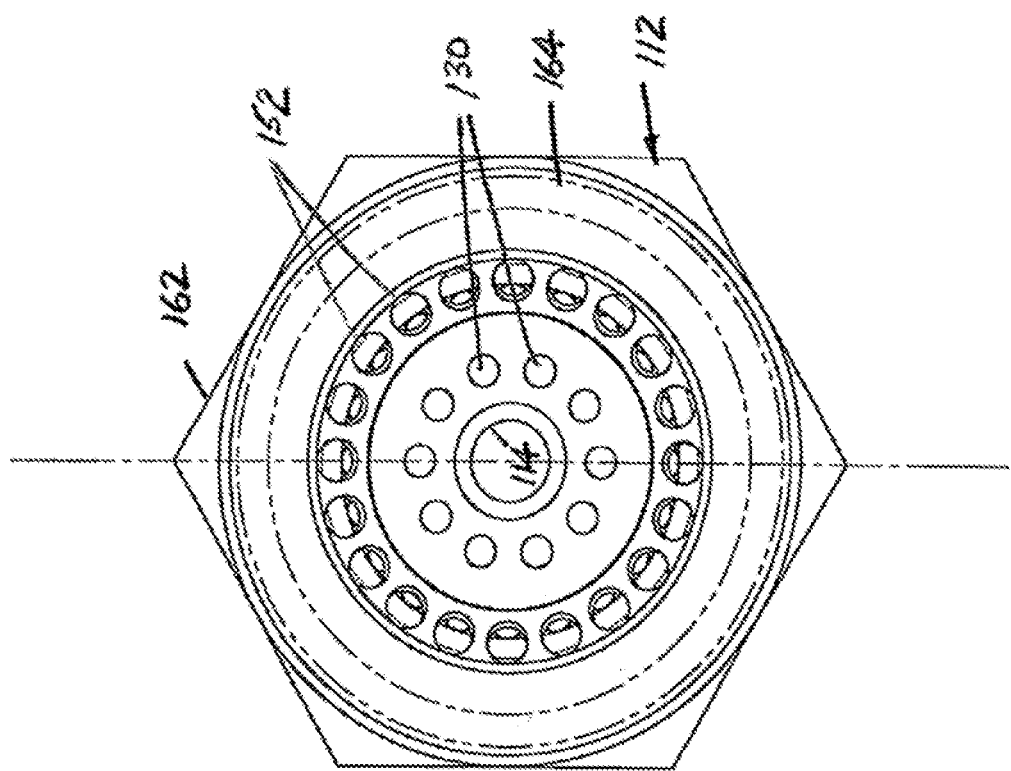
FIG. 3 is an end view taken generally from the left-hand-side of FIG. 2.
Figure 4:
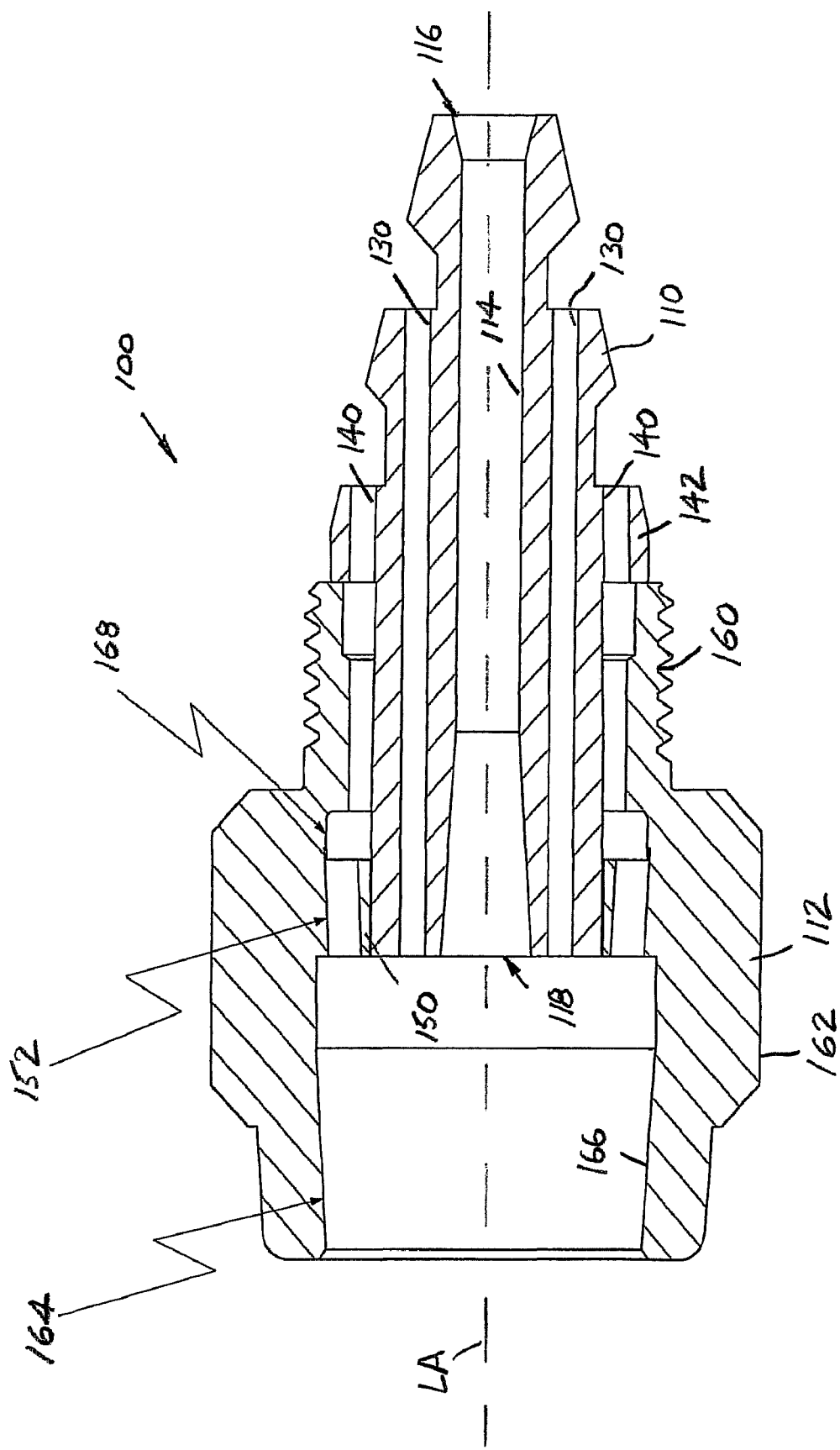
FIG. 4 is a longitudinal cross-sectional view taken generally along the lines A-A of FIG. 3.
Figure 7:
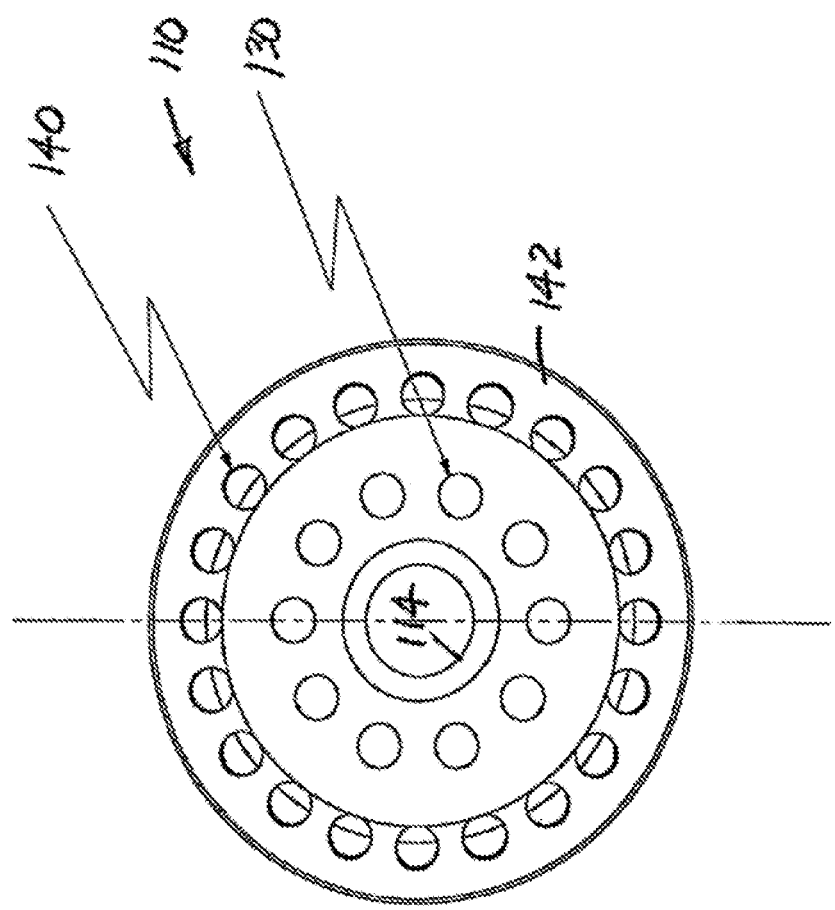
FIG. 7 is an enlarged end view of the tip.
Figure 8:
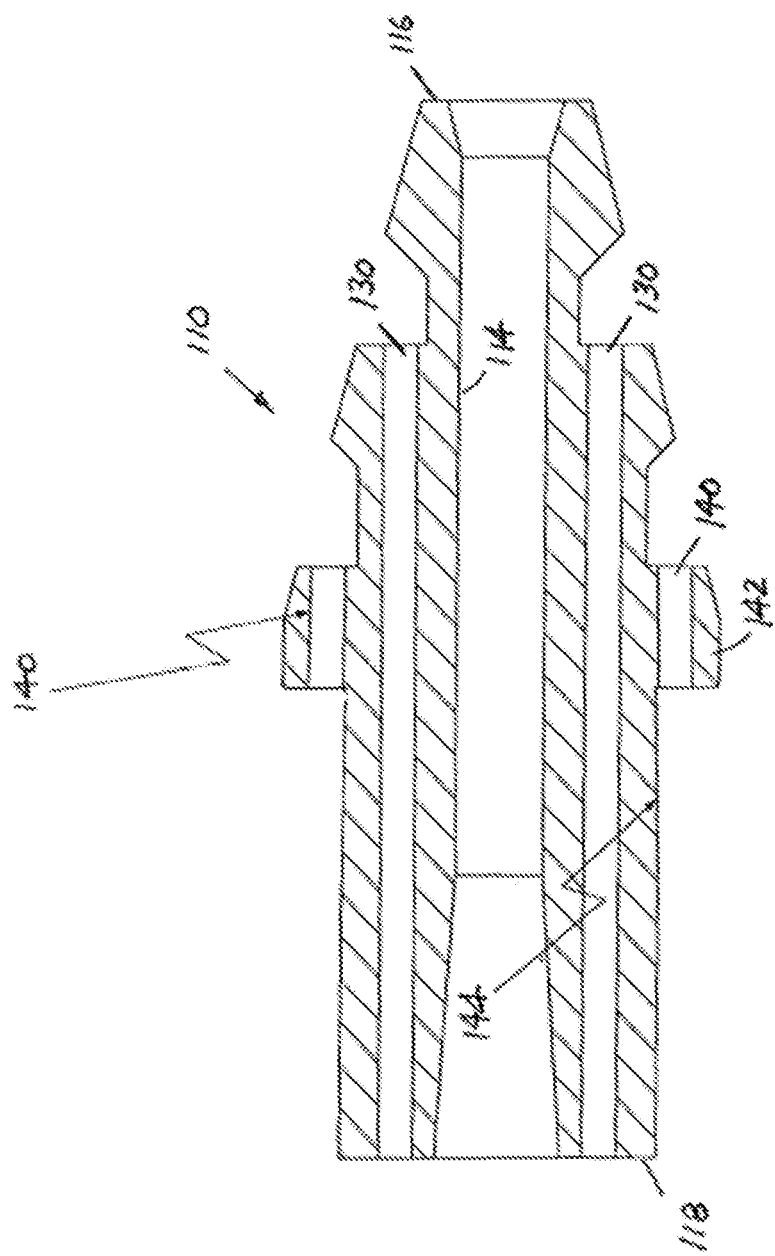
FIG. 8 is a cross-sectional view of the tip taken generally along the lines B-B of FIG. 7.

FIGS. 1-8 illustrate a post mix nozzle assembly 100 that includes a first component or nozzle 110 and a hollow retainer nut 112. The nozzle 110 includes a central, axial bore or passage 114 that extends from a first or inlet end 116 of the nozzle to a second or outlet end 118. The bore 114 typically discharges cutting gas (oxygen) supplied at the first end 116 to the second end 118 of the nozzle 110. In addition, a plurality of fuel gas passages or bores 130 (fuel gas bores)(shown as ten in number, although that number may vary) are equally spaced about the bore 114. As noted above, the fuel gas bores 130 are preferably the same size and arranged in a concentric manner around the bore 114 in the nozzle 110. In addition, a plurality of passages or bores 140 (preheat oxygen bores)(shown as twenty in number, although that number may vary depending on the number of fuel gas bores) are also disposed in concentric arrangement and extend axially through flange 142 of the nozzle 110. The flange 142 extends outwardly a greater diameter from the remainder of sidewall 144. As is also evident in FIGS. 4 and 8, opposite ends of the bore 114 are preferably tapered outwardly.

The hollow retainer nut 112 receives the second end 118 of the nozzle 110 therein. An annular flange 150 is provided along an inner periphery of the retainer nut 112, and forms a portion of the discharge end of the nozzle assembly 100. Particularly, the preheat oxygen bores 140 communicate with discharge passages 152 (also twenty passages arranged in concentric fashion to match the number of preheat oxygen bores 140) in the flange 150. Further, the nut 112 includes a threaded end 160 and tool flats 162 that facilitate assembly of the nozzle assembly to the remainder of the cutting torch (not shown). In addition, shroud 164 has an inner surface 166 that angles inwardly toward longitudinal axis LA.

The fuel gas of choice in post mix cutting nozzle assemblies is natural gas (methane), although it should be understood by one skilled in the art that this does not preclude use of different fuel gases. The combustion equation for natural gas and oxygen to achieve complete combustion is two (2) cubic feet of oxygen to one (1) cubic foot of natural gas. The ideal cutting tip design should therefore have twice the number of same size oxygen bore holes 140 to fuel gas bore holes 130. With a ratio of bore holes 140, 130 at 2:1, both gases can be set at the same pressure. This makes correct flame adjustment easier for the operator resulting in maximum efficiency. If the bore hole ratio is less than 2:1, the operator has to compensate by increasing oxygen pressure in an effort to achieve desired combustion of the gases.

This disclosure improves on prior designs in that a cutting tip of the nozzle assembly preferably has twenty 0.0595" diameter oxygen bore holes 140 and ten 0.0595" diameter fuel gas bore holes 130 (i.e., the number of bore holes 140, 130 are perfectly balanced). Although one prior art design has the same number of holes, the prior design has 0.052" and 0.055" diameter holes, respectively. As a result, prior cutting nozzles do not provide an accurate 2:1 bore hole ratio, and likewise do not result in optimal combustion of the intermixed fuel gas (natural gas) and oxygen.

With the present disclosure, the use of the larger bore holes, i.e., an increased dimension of each of the oxygen bore holes 140 from 0.052" to 0.0595" and an increased dimension of each of the fuel gas bores 130 from 0.055" to 0.0595", results in an overall increase in bore hole diameters that increases gas flow capacity, e.g., by about 26% in association with the above-noted dimensional changes when compared to the prior art. Improved gas flow capacity allows for proper flame adjustment at a lower gas pressure setting. This lower gas pressure setting translates to lower gas consumption and increased cost savings. In the prior art design, the outer ring of oxygen bore holes were limited to 0.052" diameter because of the width of the flange the outer ring bore holes are drilled through.

In the present disclosure and as shown in FIGS. 1-8, the nozzle assembly 100 incorporates a wider flange 142 allowing for 0.0595" diameter oxygen bore holes 140. This is achieved by undercutting the outside diameter of the nozzle 110 at the intersection of the flange 142 and nozzle sidewall and drilling the bore holes 140 at an angle, for example, a one degree (1°) inward angle (see for example FIG. 8) toward the longitudinal axis LA.

The new design of the present disclosure produces an improved, tighter gas stream, promoting more thorough mixing, and therefore more efficient combustion as a result of using an improved shroud, specifically an improved cylindrical shroud. In prior designs both oxygen and fuel gases exited straight bore holes and relied on the turbulence created by the cutting oxygen stream inside the shroud to promote mixing. The shroud on this new invention as shown in the accompanying drawings features preheat oxygen bore holes 140 which are angled up to about six degrees (see for example FIGS. 4 and 5) relative to the longitudinal axis LA, although the angle may more preferably be about three to about four degrees. Preheat oxygen bore holes 140 of the nozzle 110 passes through cavity 168 in the retaining nut 112 and exits through the angled bore holes 152. The angled bore holes 152 in the retaining nut 112 direct the oxygen flow to intersect the flow of preheat fuel gas from bore holes 130 from the nozzle 110 further improving mixing performance. The shroud in the previous design has a straight side wall while the new design features a side wall 166 with an inward angle (see, for example FIG. 4). The side wall 166 can be angled up to about six degrees (perhaps more preferably about three to about four degrees) relative to longitudinal axis LA of the main bore or passage 114 in the cutting nozzle. This greater concentration of the discharge gases provides for a hotter more concentrated flame while reducing the amount of lost gases.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept, or if they include equivalent structural elements with insubstantial differences.

It is claimed:

1. A method of making a cutting nozzle assembly comprising:
   providing a nozzle;
   forming a central bore along a longitudinal axis of the nozzle;
   forming a plurality of spaced fuel gas bores arranged around the central bore;
   forming preheat passages arranged around both the central bore and the fuel gas bores;
   providing a retaining nut dimensioned for receipt over at least a portion of the nozzle, and including a shroud extending axially outward at one end of the retaining nut, the shroud extending axially outward from discharge ends of the nozzle and the preheat passages when the retaining nut is assembled with the nozzle; and
   angling an inner surface of the shroud inwardly toward the longitudinal axis.

2. The method of claim 1 including angling the preheat passages up to about six degrees relative to the longitudinal axis.

3. The method of claim 1 wherein the angling step includes angling the inner surface of the shroud toward the longitudinal axis up to about six degrees.

4. The method of claim 1 further comprising making the preheat passages and the fuel gas bores equally sized.

5. The method of claim 4 further comprising providing twice the number of preheat passages as fuel gas bores.

6. The method of claim 3 including angling the preheat passages up to about six degrees relative to the longitudinal axis.

7. A cutting nozzle assembly comprising:
   a nozzle having a central bore extending therethrough along a longitudinal axis through which an associated cutting gas is discharged at a discharge end, and a plurality of spaced fuel gas bores arranged around the central bore, and additional preheat passages arranged around both the central bore and the fuel gas bores;
   a retaining nut receiving at least a portion of the nozzle therein, the retaining nut including a shroud extending axially outward at a first end of the retaining nut by an axial dimension so that the shroud extends axially outward from the discharge end of the nozzle an axially outward from terminal ends of the additional preheat passages when the retaining nut is assembled with the nozzle, the shroud having an inner surface angled toward the longitudinal axis.

8. The assembly of claim 7 wherein the preheat passages are angled up to about six degrees relative to the longitudinal axis.

9. The assembly of claim 7 wherein the preheat passages are angled up to about three to about four degrees relative to the longitudinal axis.

10. The assembly of claim 9 wherein the shroud inner surface is angled up to about six degrees relative to the longitudinal axis.

11. The assembly of claim 7 wherein the shroud inner surface is angled up to about six degrees relative to the longitudinal axis.

12. The assembly of claim 11 wherein the shroud inner surface is angled up to about three to about four degrees relative to the longitudinal axis.

13. The assembly of claim 7 wherein the fuel gas bores are equally sized.

14. The assembly of claim 7 wherein the preheat passages are equally sized.

15. The assembly of claim 7 wherein there are twice the number of preheat passages as fuel gas bores.

16. The assembly of claim 15 wherein the preheat passages and the fuel gas bores are equally sized.

17. The assembly of claim 7 wherein the preheat passages and the fuel gas bores are equally sized.

18. A cutting nozzle assembly comprising:
   a nozzle having a central bore extending therethrough along a longitudinal axis through which an associated cutting gas is discharged at a discharge end, and a plurality of spaced fuel gas bores arranged around the central bore, and additional preheat passages arranged around both the central bore and the fuel gas bores;
   a retaining nut receiving at least a portion of the nozzle therein, the retaining nut including a shroud at a first end of the retaining nut, the shroud extending axially outward from the discharge end of the nozzle, wherein both an inner surface of the shroud and the additional preheat passages are angled inwardly toward the longitudinal axis, and the shroud has an inner surface angled up to about six degrees relative to the longitudinal axis.

19. The cutting nozzle assembly of claim 18 wherein the shroud inner surface is angled up to about three to about four degrees relative to the longitudinal axis.

20. The cutting nozzle assembly of claim 18 wherein the preheat passages have an increased diameter up to 0.0595 inches.

21. The cutting nozzle assembly of claim 20 wherein the fuel gas bores have an increased diameter up to 0.0595 inches.

* * * * *